United States Patent [19]

Apfel et al.

[11] Patent Number: 4,961,263

[45] Date of Patent: Oct. 9, 1990

[54] GUIDE BAR OF SOLID MATERIAL FOR THE SAW CHAIN OF A MOTOR CHAIN SAW

[75] Inventors: Norbert Apfel; Hans P. Stehle, both of Waiblingen, Fed. Rep. of Germany

[73] Assignee: Andreas Stihl, Waiblingen, Fed. Rep. of Germany

[21] Appl. No.: 448,625

[22] Filed: Dec. 11, 1989

[30] Foreign Application Priority Data

Dec. 21, 1988 [DE] Fed. Rep. of Germany ....... 3842975

[51] Int. Cl.[5] .............................................. B23D 57/02

[52] U.S. Cl. .......................................... 30/387; 30/383

[58] Field of Search .......................... 30/381, 383, 387

[56] References Cited

U.S. PATENT DOCUMENTS 3,416,578 12/1968 Irgens .................................... 30/387

3,473,581 10/1969 Menz ..................................... 30/387

4,794,696 1/1989 Apfel et al. .

*Primary Examiner*—Frank T. Yost

*Assistant Examiner*—Willman Fridie, Jr.

*Attorney, Agent, or Firm*—Walter Ottesen

[57] ABSTRACT

The invention relates to a guide bar having a main member made of solid material for a motor chain saw. The guide bar has two flat sides and narrow edges defining a saw chain path. A cutout extends through the main member of the guide bar for reducing weight. The openings in the main member defined by the cutout are closed by cover plates for maintaining the stiffness and are attached to the main member of the guide bar. A fill body is seated in the cutout with an approximately precise fit and is connected to the cover plates in a force-transmitting manner. In this way, a higher torsion stiffness is obtained while at the same time retaining the reduction in weight.

24 Claims, 3 Drawing Sheets

GUIDE BAR OF SOLID MATERIAL FOR THE SAW CHAIN OF A MOTOR CHAIN SAW

FIELD OF THE INVENTION

The invention relates to a guide bar of solid material for a motor chain saw. The guide bar has two flat sides and narrow edges defining a path for the saw chain. The flat sides have a cutout formed therein which extends through the guide bar for reducing weight. The openings formed by the cutout are closed by respective cover plates attached to the guide bar.

BACKGROUND OF THE INVENTION

From U.S. Pat. No. 4,794,696, it is known to arrange window like openings in the solid material of a guide bar to reduce weight and to again cover these openings with cover plates fixed on the main member of the guide bar to maintain bending stiffness. It has been shown in practice that such guide bars have a stiffness and especially a torsion stiffness which is adequate for working with a motor chain saw up to a predetermined length with a significant weight reduction.

For exceptionally high loads of the guide bar or for guide bars which are configured to be extremely long, it has however been determined that the window-like openings provided for weight reduction cannot be configured to have any desired size since then a reduction of the torsion stiffness must be considered.

SUMMARY OF THE INVENTION

It is an object of the invention to provide a guide bar of solid material such that a high torsion resistance is maintained with a significant weight reduction especially for guide bars which are configured to be very long with the guide bar being provided for the saw chain of a motor chain saw.

The guide bar of the invention is for guiding the saw chain of a chain saw and includes: a main member made of solid material and having two flat sides and an outer peripheral edge defining a guide groove for guiding the saw chain in its movement around the guide bar; the main member defining a longitudinal center axis and having a clear-through opening formed therein for reducing the weight of the guide bar; a fill body seated in the opening with an approximately precise fit; two cover plates for covering the opening on respective ones of the flat sides; and, force-transmitting connecting means for connecting the fill body to the cover plates so as to permit forces to be transmitted therebetween.

The openings in the main body of the guide bar are configured as large as possible to obtain a high weight reduction. Fill bodies are seated in these openings with an approximately precise fit. These fill bodies are connected with the cover plates closing the openings in a manner to transmit force whereby a high groove stiffness and bending stiffness of the guide bar is obtained with a weight reduction of up to 30%. Such great weight reductions can be obtained even for guide bars which are configured to be very long without the occurrence of a reduction of the bending stiffness influencing the cutting characteristics.

The fill body seated in the opening with an approximately precise fit assures a reinforcement and transmission of the forces occurring in the plane of the guide bar which can be still increased by fixing the fill body in the opening. On the one hand, the fill body is connected in a force transmitting manner to the guide bar and, on the other hand, is connected in a force transmitting manner to the cover plates so that a guide bar union of high stiffness is obtained. This guide bar union consists of the main member of the guide bar, the fill body and the cover plates.

In an advantageous embodiment of the invention, a sheet metal steel section is provided as the fill body. The fill body has longitudinal ribs lying one next to the other and lying in the longitudinal direction of the guide bar. These longitudinal ribs have longitudinal sides facing toward the cover plates for connecting to the cover plates.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
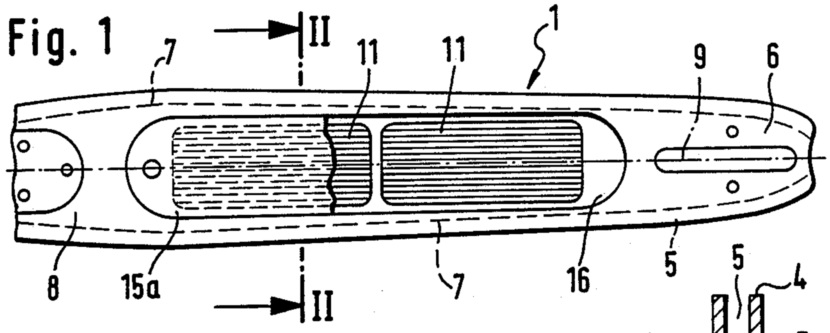
FIG. 1 is a side elevation view of a guide bar according to the invention made of solid material for a saw chain of a motor chain saw.

The guide bar 1 made of solid material has two flat sides 2 and 3 which are connected to each other via narrow edges 4. As shown in FIG. 2, the guide bar 1 has essentially a rectangular cross section. A centrally lying guide groove 5 is machined into the narrow edges 4 and is disposed about the periphery and begins at the attachment end 6 of the guide bar. At least one opening 10 is provided in the main member of the guide bar 1 in the region between the attachment end 6 and the forward end 8 and the peripherally extending groove base 7. In the embodiments of FIGS. 1 to 10, two openings 10 are arranged in the longitudinal direction of the guide bar 1 so as to lie one behind the other. The arrangement of three or more openings can be advantageous. Each opening has essentially the form of a rectangularly-shaped window having its longest length in the longitudinal direction of the guide bar. Each opening 10 is arranged symmetrically with respect to the longitudinal center axis 9 of the guide bar 1.

Figure 3:
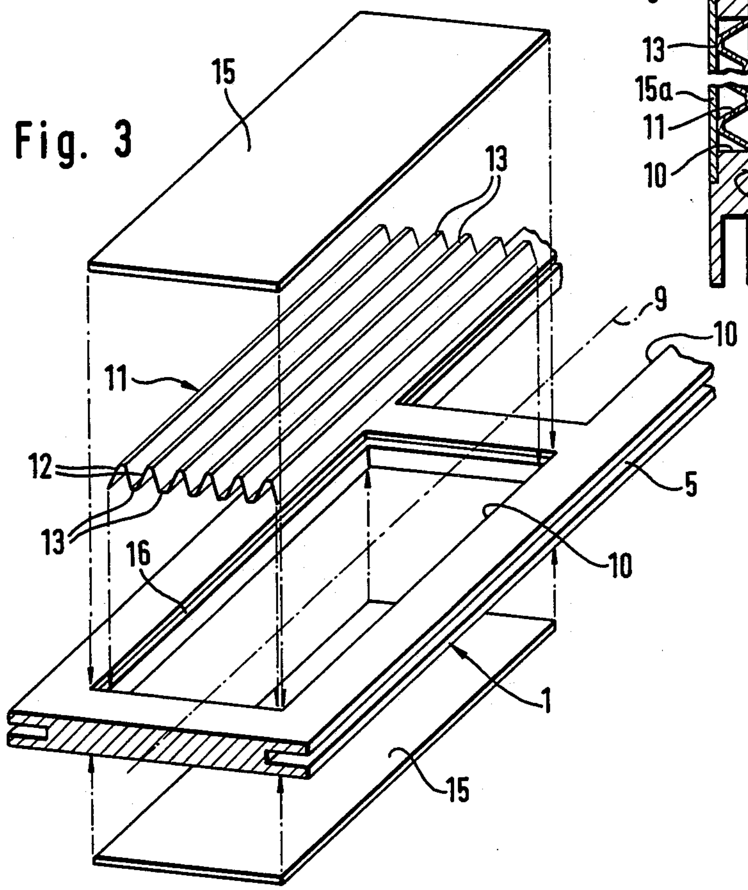
FIG. 3 is a partial exploded view of the guide bar according to FIG. 1.

As can be especially seen in FIG. 3, a one-piece fill body 11 is seated with an approximately precise fit in an opening 10. The fill body is a sheet metal steel section preferably produced by section rolling and has a section consisting of longitudinal ribs 12 lying one next to the other. The longitudinal ribs 12 are aligned in the longitudinal direction of the guide bar 1 and therefore lie approximately parallel to the longitudinal center axis 9 of the guide bar. The sheet metal section is corrugated transversely to the longitudinal center axis.

Figure 4:
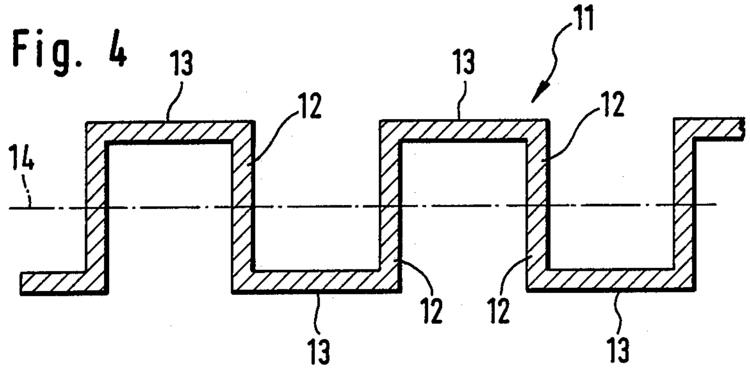
FIG. 4 is a section view through a sheet metal steel section provided as a fill body according to one embodiment of the invention.

As shown in FIG. 4, the longitudinal ribs 12 of the sheet metal section have an approximately rectangularly-shaped cross section. Each longitudinal rib 12 has a longitudinal side 13 extending in the longitudinal direction of the guide bar 1. The longitudinal side 13 lies approximately in the plane of the flat sides 2 or 3. Referring to the center plane 14 of a sheet metal section (FIG. 4), a longitudinal rib 12 lying on one flat side 2 extends into a longitudinal rib 12 lying on the other flat side 3. The elevation of the sheet metal section corresponds approximately to the thickness of the guide bar. In the embodiments of FIGS. 2 to 3, the elevation of the sheet metal section is less than the thickness of the guide bar by an amount twice the thickness of either one of the cover plates 15 or 15*a*.

As shown in FIG. 3, each opening 10 is assigned a cover plate 15 on each of the flat sides 2 and 3. In the embodiment according to FIG. 3, each cover plate 15 lies in a recess 16 in each flat side 2 and 3 in such a manner that, on the one hand, each cover plate lies on the long sides 13 of the sheet metal steel section seated as a fill body 11 approximately with a precise fit in the opening 10 and, on the other hand, that the cover plate closes the particular flat side 2 or 3 in a flush manner. The fill body 11 is then held by means of welding, gluing or soldering in the main member of the guide bar 1 as well as to the cover plates 15. In a preferred embodiment of the invention, the fill body 11 is fixed with a two-component epoxy resin adhesive in the particular opening 10 of the guide bar 1 and is held to the cover plates 15 preferably via each of the long sides 13. This is shown especially in FIG. 2.

Figure 2:
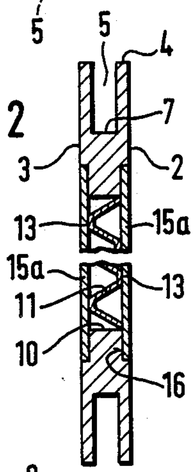
FIG. 2 is a section view taken along line II—II of the guide bar of FIG. 1.

In another embodiment of the invention and according to FIG. 1, the openings 10 are arranged in the longitudinal direction of the guide bar so as to be one behind the other. These openings are covered with a common cover plate 15*a* on each of the flat sides 2 and 3 and are attached to the main member of the guide bar 1 as well as to the long sides 13 of the fill body 11. The recesses 16 provided for seating the cover plates 15*a* in a flush manner are configured so as to have a semi-circular shape at the ends of the openings 10 lying in the longitudinal direction.

Figure 5:
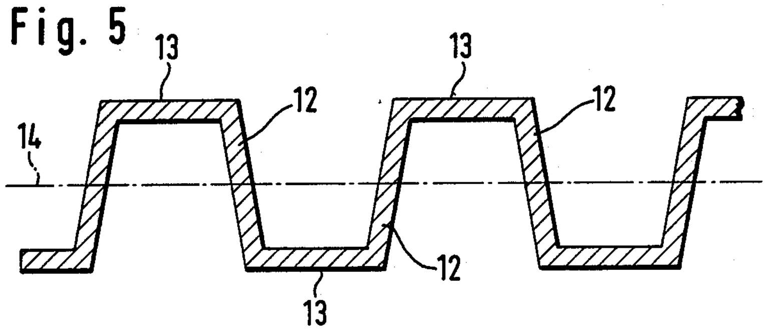
FIG. 5 is a section view through a sheet metal steel section provided as a fill body according to another embodiment of the invention.

The form of a sheet metal section according to FIG. 4 having a cross section of the longitudinal ribs 12 which is precisely rectangular is costly to produce. According to the invention, it is therefore provided that the longitudinal ribs 12 lying one next to the other are configured so as to have a trapezoidal shape in cross section with the shorter base of the trapezoid forming the long side 13 facing toward the cover plates 15 (FIG. 5).

Figure 6:
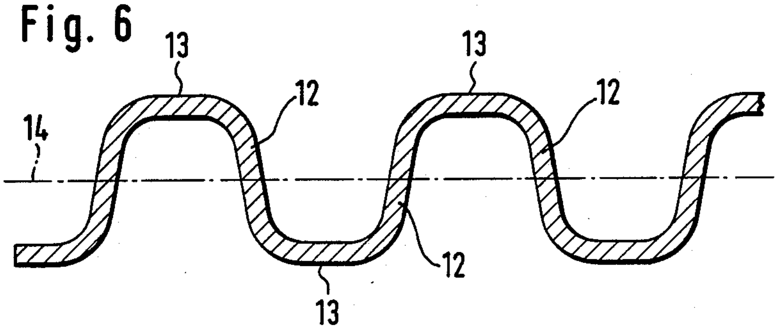
FIG. 6 is a section through a sheet metal steel section provided as a fill body.

In a further simplification of the form of the sheet metal steel section, the latter can be provided with rounded edges whereby simply configured rolled steel sections can be used for producing the sheet metal section (FIG. 6).

The form of the fill body must in each case be so configured that it has long sides 13 facing to the cover plates by means of which the fill body 11 can be connected to the cover plates in a force transmitting manner. For this purpose, each of the long sides 13 is advantageously connected to the cover plate toward which it faces.

The material of the fill body is advantageously a sheet metal steel section. However, aluminum, aluminum alloys or fiber-reinforced plastic can be used.

Figure 7:
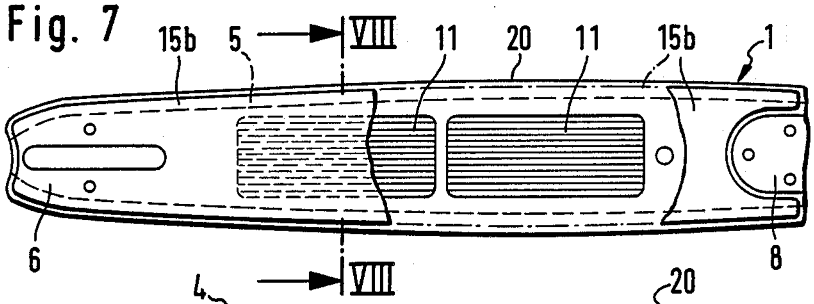
FIG. 7 is a side elevation view of a guide bar according to another embodiment of the invention having cover plates arranged on the flat sides.
Figure 8:
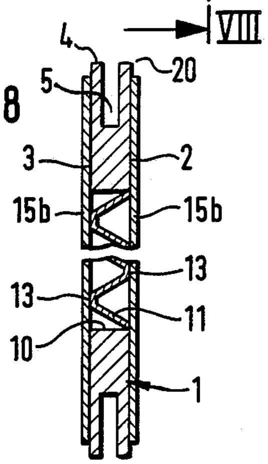
FIG. 8 is a section view taken along the line VIII—VIII in FIG. 7.
Figure 10:
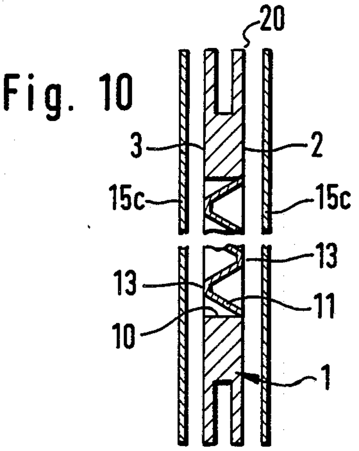
FIG. 10 is a section view taken along line X—X of FIGS. 9 and 10; and, FIG. 11 is a side elevation view of a further embodiment of a guide bar according to the invention.

In a further embodiment of the invention, the long sides 13 of the fill body are arranged to lie in the plane of the flat sides 2 or 3 as shown in FIG. 7 and the cover plates 15*b* are attached to the flat sides. Preferably, the outer boundary edges of the cover plates 15*b* lie slightly below the edges 20 between the flat sides 2 and 3 and the narrow sides 4. In this manner, the shearing forces acting on the edges 20 cannot act on the covers 15*b* so as to lift the same (FIG. 8).

For specific applications, it is advantageous to arrange the covers 15*c* over the entire surface of the flat sides 2 and 3 with the boundary edges of the covers 15*c* lying in congruence with the edges 20 between narrow sides 4 and flat sides 2 or 3.

Figure 11:
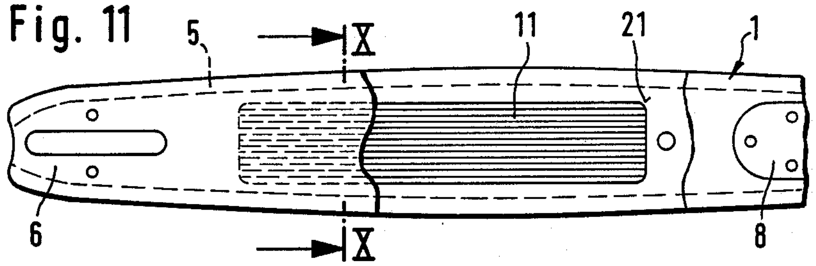

It can be advantageous to provide only one opening in the solid material of the guide bar 1 with this opening extending over a large part of the guide bar in its length and in its width (FIG. 11). In this embodiment too, it is essential that the fill body 11 be seated with an approximately precise fit and have surfaces formed, for example, by long sides 13 which face toward the cover plates 15*c* in order to be connected therewith.

Figure 9:
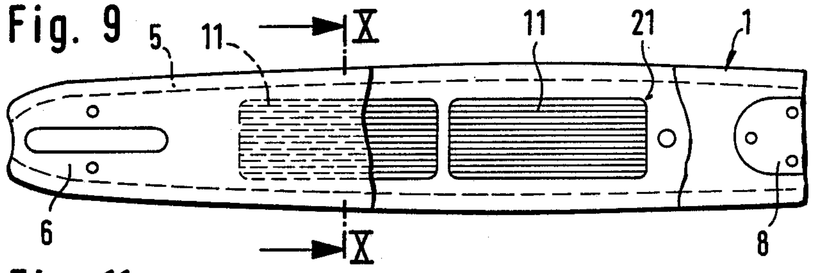
FIG. 9 is a side elevation view of a guide bar according to the invention having cover plates covering its flat sides.

It is preferable to configure the openings 10 so that the corners 21 are rounded to avoid notch effects in the corners 21 (FIG. 9).

The cover plates are preferably 0.2 to 0.8 mm thick. In a preferred embodiment, the cover plates are made of spring band foils made of steel and are glued to the flat sides 2, 3 of the guide bar 1.

A precise fit seating of the fill piece is strived for obtaining a high stiffness of the guide bar. In the context of a series production, tolerances must however be allowed which do not always guarantee an exact fit precision. But it has been shown that especially for gluing the fill body in the opening, a high stiffness of the guide bar is obtained even without a one hundred percent fit precision.

It is understood that the foregoing description is that of the preferred embodiments of the invention and that various changes and modifications may be made thereto without departing from the spirit and scope of the invention as defined in the appended claims.

What is claimed is:

1. A guide bar for guiding the saw chain of a chain saw comprising:

a main member made of solid material and having two flat sides and an outer peripheral edge defining a guide groove for guiding the saw chain in its movement around the guide bar;

said main member defining a longitudinal center axis and having a clear-through opening formed therein for reducing the weight of the guide bar;

a fill body seated in said opening with an approximately precise fit;

two cover plates for covering said opening on respective ones of said flat sides;

said fill body defining a plurality of ribs extending across said opening;

said ribs conjointly defining two sets of component surfaces facing respective ones of said cover plates; and, force-transmitting connecting means for connecting said fill body to one of said cover plates at one of said sets of component surfaces so as to permit forces to be transmitted therebetween and to the other one of said cover plates at the other one of said sets of component surfaces so as to also permit forces to be transmitted therebetween.

2. The guide bar of claim 1, said fill body being a sheet metal section and said ribs being aligned in the direction of said axis.

3. The guide bar of claim 2, said sheet metal section being made of steel.

4. The guide bar of claim 1, said force-transmitting means being selected from the group consisting of weld means, adhesive means and solder means.

5. Guide bar of claim 1, said opening having a predetermined length and width; and, said opening extending over a large part of the guide bar with respect to said length and said width.

6. The guide bar of claim 1, said main member having a plurality of said openings arranged one behind the other in the longitudinal direction of the guide bar.

7. The guide bar of claim 1, said opening defining a window which is essentially rectangularly shaped and has its largest dimension in the longitudinal direction of the guide bar.

8. The guide bar of claim 1, said opening being arranged symmetrically with respect to said longitudinal center axis of the guide bar.

9. The guide bar of claim 1, said main member having an inner peripheral edge; protrusion means formed on said inner peripheral edge to define first and second seating means for receiving respective ones of said cover plates thereon; and, said first and second seating means being recessed relative to corresponding ones of said flat sides so as to cause the flat outer sides of said plates to be flush with corresponding ones of said flat sides of said main member.

10. The guide bar of claim 1, each of said cover plates having a boundary edge; and, said cover plates being arranged to lie on respective ones of said flat sides so as to cause the boundary edges of said cover plates to lie slightly below said outer peripheral edge of said main member.

11. The guide bar of claim 1, said cover plates being arranged to lie on respective ones of said flat sides so as to extend up to said outer peripheral edge of said main member.

12. The guide bar of claim 1, said main member having a plurality of said openings arranged one behind the other in the longitudinal direction of the guide bar; and, said cover plates extending over at least some of said openings.

13. The guide bar of claim 12, said cover plates extending over all of said openings.

14. The guide bar of claim 1, said ribs being aligned in the direction of said axis.

15. The guide bar of claim 1, said section being configured so as to cause said profile to be a plurality of longitudinal ribs lying one next to the other with said ribs having a cross section which is approximately trapezoidally shaped.

16. The guide bar of claim 1, said section being configured so as to cause said profile to be a plurality of longitudinal ribs lying one next to the other with said ribs having a cross section which is approximately rectangularly shaped.

17. The guide bar of claim 1, one set of said component surfaces and one of said cover plates defining a first interface and the other set of component surfaces and the other one of said cover plates defining a second interface; said main member having an inner peripheral edge defining said opening; said fill body defining an outer peripheral edge adjacent said inner peripheral edges and said edges conjointly defining a third interface; and, said force-transmitting connecting means being a two-component adhesive disposed at each of said interfaces.

18. A guide bar for guiding the saw chain of a chain saw comprising:

a main member made of solid material and having two flat sides and an outer peripheral edge defining a guide groove for guiding the saw chain in its movement around the guide bar;

said main member defining a longitudinal center axis and having a clear-through opening formed therein for reducing the weight of the guide bar;

a fill body seated in said opening with an approximately precise fit;

two cover plates for covering said opening on respective ones of said flat sides;

force-transmitting connecting means for connecting said fill body to said cover plates so as to permit forces to be transmitted therebetween;

said fill body being a sheet metal section having a profile aligned in the direction of said axis and having two sets of component surfaces facing respective ones of said cover plates; and, said section being configured so as to cause said profile to be a plurality of longitudinal ribs lying one next to the other with said ribs having a cross section which is approximately trapezoidally shaped.

19. The guide bar of claim 18, each of said ribs defining two rounded edges delimiting a corresponding one of said component surfaces.

20. A guide bar for guiding the saw chain of a chain saw comprising:

a main member made of solid material and having two flat sides and an outer peripheral edge defining a guide groove for guiding the saw chain in its movement around the guide bar;

said main member defining a longitudinal center axis and having a clear-through opening formed therein for reducing the weight of the guide bar;

a fill body seated in said opening with an approximately precise fit;

two cover plates for covering said opening on respective ones of said flat sides;

force-transmitting connecting means for connecting said fill body to said cover plates so as to permit forces to be transmitted therebetween;

said fill body being a sheet metal section having a profile aligned in the direction of said axis and having two sets of component surfaces facing respective ones of said cover plates; and, said section being configured so as to cause said profile to be a plurality of longitudinal ribs lying one next to the other with said ribs having a cross section which is approximately rectangularly shaped.

21. The guide bar of claim 20, each of said ribs defining two rounded edges delimiting a corresponding one of said component surfaces.

22. A guide bar for guiding the saw chain of a chain saw comprising:

a main member made of solid material and having two flat sides and an outer peripheral edge defining a guide groove for guiding the saw chain in its movement around the guide bar;

said main member defining a longitudinal center axis and having a clear-through opening formed therein for reducing the weight of the guide bar;

a fill body seated in said opening with an approximately precise fit;

two cover plates for covering said opening on respective ones of said flat sides;

force-transmitting connecting means for connecting said fill body to said cover plates so as to permit forces to be transmitted therebetween;

said fill body being a sheet metal section having a profile aligned in the direction of said axis and having two sets of component surfaces facing respective ones of said cover plates; and, said cover plates each being a spring band foil.

23. A guide bar for guiding the saw chain of a chain saw comprising:

a main member made of solid material and having two flat sides and an outer peripheral edge defining a guide groove for guiding the saw chain in its movement around the guide bar;

said main member defining a longitudinal center axis and having a clear-through opening formed therein for reducing the weight of the guide bar;

a fill body seated in said opening with an approximately precise fit;

two cover plates for covering said opening on respective ones of said flat sides;

force-transmitting connecting means for connecting said fill body to said cover plates so as to permit forces to be transmitted therebetween;

said fill body being a sheet metal section having a profile aligned in the direction of said axis and having two sets of component surfaces facing respective ones of said cover plates;

one set of said component surfaces and one of said cover plates defining a first interface and the other set of component surfaces and the other one of said cover plates defining a second interface; said main member having an inner peripheral edge defining said opening;

said fill body defining an outer peripheral edge adjacent said inner peripheral edges and said edges conjointly defining a third interface; and, said force-transmitting connecting means being a two-component adhesive disposed at each of said interfaces.

24. The guide bar of claim 23, said two-component adhesive being an epoxy resin.

* * * * *